(12) United States Patent
Chou

(10) Patent No.: US 12,018,143 B2
(45) Date of Patent: Jun. 25, 2024

(54) IONOMERS OF ETHYLENE ACID COPOLYMERS WITH ENHANCED CREEP RESISTANCE

(71) Applicant: Dow Global Technologies LLC, Midland, MI (US)

(72) Inventor: Richard Tien Hua Chou, Wilmington, DE (US)

(73) Assignee: Dow Global Technologies LLC, Midland, MI (US)

( * ) Notice: Subject to any disclaimer, the term of this patent is extended or adjusted under 35 U.S.C. 154(b) by 455 days.

(21) Appl. No.: 17/260,902

(22) PCT Filed: Jul. 29, 2019

(86) PCT No.: PCT/US2019/043906
§ 371 (c)(1),
(2) Date: Jan. 15, 2021

(87) PCT Pub. No.: WO2020/028245
PCT Pub. Date: Feb. 6, 2020

(65) Prior Publication Data
US 2021/0261762 A1     Aug. 26, 2021

Related U.S. Application Data

(60) Provisional application No. 62/712,591, filed on Jul. 31, 2018.

(51) Int. Cl.
| | | |
|---|---|---|
| *C08L 23/08* | (2006.01) | |
| *C08F 220/06* | (2006.01) | |
| *C08F 220/14* | (2006.01) | |
| *C08F 220/18* | (2006.01) | |
| *C08F 222/06* | (2006.01) | |
| *C08K 3/22* | (2006.01) | |
| *C08K 5/098* | (2006.01) | |

(52) U.S. Cl.
CPC ........ *C08L 23/0876* (2013.01); *C08F 220/06* (2013.01); *C08F 220/14* (2013.01); *C08F 220/1802* (2020.02); *C08F 220/1804* (2020.02); *C08F 222/06* (2013.01); *C08K 3/22* (2013.01); *C08K 5/098* (2013.01); *C08K 2003/2203* (2013.01); *C08K 2003/2224* (2013.01); *C08K 2003/2296* (2013.01); *C08L 2205/025* (2013.01)

(58) Field of Classification Search
CPC ............ C08L 23/0876; C08F 220/14; C08F 220/1802; C08F 220/1804; C08F 222/06
USPC ...................... 526/272; 525/327.8
See application file for complete search history.

(56) References Cited

U.S. PATENT DOCUMENTS

| | | | |
|---|---|---|---|
| 3,264,272 A | 8/1966 | Watkin | |
| 4,766,174 A | 8/1988 | Statz | |
| 5,580,927 A | 12/1996 | Chou et al. | |
| 5,700,890 A * | 12/1997 | Chou ..................... | C08F 8/44 |
| | | | 526/318.4 |
| 5,859,137 A | 1/1999 | Chou | |
| 5,866,658 A | 2/1999 | Talkowski | |
| 8,420,176 B2 | 4/2013 | Chen et al. | |
| 9,415,274 B2 * | 8/2016 | Sullivan ............. | A63B 37/0049 |
| 2003/0050373 A1 * | 3/2003 | Chen .................. | A63B 37/0003 |
| | | | 524/322 |
| 2011/0020573 A1 * | 1/2011 | Chou .................. | C08L 23/0869 |
| | | | 428/36.1 |
| 2014/0364253 A1 | 12/2014 | Sullivan et al. | |
| 2021/0261762 A1 | 9/2021 | Chou | |

FOREIGN PATENT DOCUMENTS

| | | | | |
|---|---|---|---|---|
| GB | 1113409 A * | 5/1968 | ............ | C08F 210/02 |
| JP | 2013500356 A | 1/2013 | | |
| WO | 0153415 A1 | 7/2001 | | |
| WO | 03064520 A2 | 8/2003 | | |
| WO | 2004113445 A1 | 12/2004 | | |

OTHER PUBLICATIONS

International Search Report and Written Opinion pertaining to PCT/US2019/043586, dated Feb. 3, 2020.
International Search Report and Written Opinion pertaining to PCT/US2019/043906, dated Nov. 12, 2019.
Japanese Office Action dated Jun. 27, 2023, pertaining to JP Patent Application No. 2021-503563, 23 pgs.
Non-Final Office Action dated Jun. 6, 2023, pertaining to U.S. Appl. No. 17/260,904.
Chinese Office Action dated Oct. 28, 2023, pertaining to CN Patent Application No. 201980046713.2, 6 pgs.

(Continued)

*Primary Examiner* — Heidi R Kelley
*Assistant Examiner* — Surbhi M Du
(74) *Attorney, Agent, or Firm* — Dinsmore & Shohl LLP

(57) ABSTRACT

An ionomer may include a neutralized blend of an ethylene acid copolymer and an aliphatic, mono-functional organic acid. The ethylene acid copolymer may be the polymerized reaction product of: ethylene, alkyl acrylate; optionally monocarboxylic acid monomer; and unsaturated dicarboxylic acid monomer. Another ionomer may include a neutralized blend of a first ethylene acid copolymer, a second ethylene acid copolymer, and an aliphatic, mono-functional organic acid. The first ethylene acid copolymer may be the polymerized reaction product of ethylene; monocarboxylic acid monomer; and optionally alkyl acrylate. The second ethylene acid copolymer may be the polymerized reaction product of: ethylene; alkyl acrylate; and unsaturated dicarboxylic acid monomer. Either blend may comprise from 5 to 40 wt. % of the aliphatic, mono-functional organic acid. At least 30 mole percent of total acid units of either blend may be neutralized with a magnesium cation of the magnesium neutralizing salt.

20 Claims, No Drawings

(56) References Cited

OTHER PUBLICATIONS

Japanese Office Action dated Dec. 12, 2023, pertaining to JP Patent Application No. 2021-503563, 15 pgs.
Japanese Office Action dated Jan. 9, 2024, pertaining to JP Patent Application No. 2021-501275, 6 pgs.
Chinese Office Action, dated Aug. 1, 2023, pertaining to Chinese Patent Application No. 201980047169.3, 6 pgs.
U.S. Office Action, dated Sep. 14, 2023, pertaining to U.S. Appl. No. 17/260,904, 9 pgs.
U.S. Notice of Allowance dated Nov. 2, 2023, pertaining to U.S. Appl. No. 17/260,904, 5 pgs.
Brazil Office Action dated Feb. 27, 2024, pertaining to BR Patent Application No. BR112021000469.6, 4 pgs.

* cited by examiner

IONOMERS OF ETHYLENE ACID COPOLYMERS WITH ENHANCED CREEP RESISTANCE

CROSS-REFERENCE TO RELATED APPLICATIONS

This application is a National Stage Entry under 35 U.S.C. § 371 of International Patent Application No. PCT/US2019/043906, filed Jul. 29, 2019, which claims priority to U.S. Provisional Patent Application No. 62/712,591, filed on Jul. 31, 2018, the entire disclosures of which are hereby incorporated by reference.

TECHNICAL FIELD

Embodiments of the present disclosure generally relate to ionomer resins, and are specifically related to ionomers including the polymerized reaction product of the ethylene, monocarboxylic acid monomers, unsaturated dicarboxylic acid monomers, alkyl acrylate monomers, aliphatic mono-functional organic acid, and combinations thereof, which are at least partially neutralized with magnesium cations.

BACKGROUND

Ionomers are commonly used materials in various applications, because they have higher tensile strength, greater clarity, better abrasion resistance and higher stiffness than the precursor acid copolymers. For example, the ionomers of ethylene acid copolymers have found utility in many applications, such as food packaging, foamed parts, injection molded parts (e.g., cosmetic containers), and golf ball components.

Although ionomers may be utilized in many applications, ionomers have a limited usage temperature that restricts ionomers from being used in applications in which creep resistance is needed at temperatures above 60° C. For example, an ionomer may deform under stress at temperature above 60° C. The dynamic mechanical thermal analysis reveals a large drop in mechanical strength of an ionomer at about 60° C. which correlates to the onset of the dissociation of the ion aggregates.

SUMMARY

Accordingly, it may be beneficial to develop alternative ionomers having improved creep resistance, while maintaining the physical and chemical character of the ionomer, such as optical clarity and toughness.

In embodiments, ionomers of this disclosure include a neutralized blend of an ethylene acid copolymer and an aliphatic, mono-functional organic acid. The blend includes from 60 to 95 wt. %, based on the total wt. % of the blend, of the ethylene acid copolymer; and from 5 to 40 wt. % of the aliphatic, mono-functional organic acid based on the total wt. % of the blend, wherein the aliphatic, mono-functional organic acid has fewer than 36 carbon atoms. At least 30 mole percent of total acid units of the blend are neutralized with a magnesium cation of the magnesium neutralizing salt. The ethylene acid copolymer in the blend includes the polymerized reaction product of ethylene, from 1 to 40 wt. % of alkyl acrylate based on the total wt. % of the monomers present in the ethylene acid copolymer, from 2 to 15 wt. % of unsaturated dicarboxylic acid monomer based on the total wt. % of the monomers present in the ethylene acid copolymer, and optionally from 0 to 20 wt. % of monocarboxylic acid monomer based on the total wt. % of the monomers present in the ethylene acid copolymer.

In one or more embodiments, ionomers of this disclosure include a neutralized blend of a first ethylene acid copolymer, a second ethylene acid copolymer, and an aliphatic, mono-functional organic acid, in which the aliphatic, mono-functional organic acid has fewer than 36 carbon atoms. The ratio of the first ethylene acid copolymer to the second ethylene acid copolymer in the blend is from 90/10 wt. % to 10/90 wt. %; and from 5 to 40 wt. %, based on the total wt. % of the blend, of the aliphatic, mono-functional organic acid, and at least 30 mole percent of total acid units of the blend are neutralized with a magnesium cation of a magnesium neutralizing salt.

In one or more embodiments of the blend, the first ethylene acid copolymer of the blend is the polymerized reaction product of ethylene; from 2 to 20 wt. % of monocarboxylic acid monomer, based on the total wt. % of monomer present in the first ethylene acid copolymer, and from 0 to 40 wt. % of alkyl acrylate, based on the total wt. % of monomer present in the first ethylene acid copolymer.

In various embodiments of the blend, the second ethylene acid copolymer is the polymerized reaction product of: ethylene; from 1 to 40 wt. % of alkyl acrylate, based on the total wt. % of the monomers present in the second ethylene acid copolymer; from 0 to 20 wt. % of monocarboxylic acid monomer, based on the total wt. % of the monomers present in the second ethylene acid copolymer; and from 2 to 15 wt. % unsaturated dicarboxylic acid monomer, based on the total wt. % of the monomers present in the second ethylene acid copolymer.

DETAILED DESCRIPTION

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of various embodiments, suitable methods and materials are described herein.

Unless stated otherwise, all percentages, parts, ratios, etc., are by weight. When an amount, concentration, or other value or parameter is given as either a range, preferred range, or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having," or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the disclosure. Where applicants have defined an embodiment or a portion thereof with an open-ended term such as "comprising," unless otherwise stated, the description should be interpreted to also describe such an embodiment using the term "consisting essentially of."

Use of "a" or "an" are employed to describe elements and components of various embodiments. This is merely for convenience and to give a general sense of the various embodiments. This description should be read to include one or at least one and the singular also includes the plural unless it is obvious that it is meant otherwise.

The term "polymer" refers to a polymeric compound prepared by polymerizing monomers, whether of the same or a different type. The generic term polymer thus embraces the terms "homopolymer" and "copolymer." The term "homopolymer" refers to polymers prepared from only one type of monomer; the term "copolymer" refers to polymers prepared from two or more different monomers, and for the purpose of this disclosure may include "terpolymers" and "interpolymer."

The term "monocarboxylic acid monomer" means a molecule having a reactive portion, such as a vinyl or vinylene, that may bond to other monomers to form a polymer and a carboxylic acid (—C(O)OH) moiety that is not included in the reactive portion. For example, (meth)acrylic acid is a monocarboxylic acid monomer, in which the vinylene is the reactive portion and there is a carboxylic acid. The term "(meth)acrylic acid" includes methacrylic acid and/or acrylic acid and "(meth)acrylate" includes methacrylate, acrylate, or combinations of methacrylate and acrylate.

The term "unsaturated dicarboxylic acid monomer" as used in this disclosure means a molecule having a reactive portion, such as a vinyl or vinylene, that may bond to other monomers to form a polymer and two carboxylic acid (—C(O)OH) groups that are not included in the reactive portion. Additionally, "unsaturated dicarboxylic acid monomer" includes unsaturated dicarboxylic acid derivative monomers (half esters and anhydrides).

Various embodiments are directed to ionomers that include a neutralized blend of an ethylene acid copolymer and an aliphatic, mono-functional organic acid. In one or more embodiments, the neutralized blend may include the ethylene acid copolymer in amounts from 60 to 95 wt. %, based on the total weight percent (wt. %) of the blend, and from 5 to 40 wt. % of the aliphatic, mono-functional organic acid based on the total wt. % of the blend. In some embodiments, the ionomers include a neutralized blend of an ethylene acid copolymer and an aliphatic, mono-functional organic acid, in which the amount of ethylene acid copolymer is from 65 to 80 wt. %, from 70 to 85 wt. %, or from 70 to 80 wt. %. In some embodiments, the aliphatic, mono-functional organic acid is from 10 to 40 wt. %, 15 to 40 wt. %, or 20 to 40 wt. %, In some embodiments, at least 30 mole percent (mol %) of total acid units of the blend are neutralized with a magnesium cation of a magnesium neutralizing salt. In some embodiments, from 35 to 50 mol %, from 45 to 70 mol %, from 60 to 80 mol %, or from 80 to 100 mol % of the total acid units of the blend are neutralized with a magnesium cation of a magnesium neutralizing salt.

In some embodiments, the ionomer may include cations other than magnesium cations and in addition to the magnesium cation in the blend. The blend may be neutralized by at least one additional metal cation of a neutralizing salt. The neutralizing salt of the at least one additional metal cation may be selected from the group of zinc salt, lithium salt, and sodium salt. In some embodiments, the ionomers may include from 0% to 10%, from 1% to 10%, from 5% to 20%, from 5% to 30%, or from 10% to 50% of the total acid units of the blend are neutralized with sodium cation of the neutralizing salt, lithium cation of the neutralizing salt, zinc cation of the neutralizing salt, or combinations thereof. In one or more embodiments, at least 70 mole percent of total acid units of the blend are neutralized by metal cations of a neutralizing salt, in which at least 30 mole present of the at least 70 mole percent of total acid units of the blend are neutralized by a magnesium cation of a magnesium salt.

In one or more embodiments, the ethylene acid copolymer includes the polymerization product of ethylene, alkyl acrylate, monocarboxylic acid monomers, unsaturated dicarboxylic acid monomer. In some embodiments of the ethylene acid copolymer of the blend, the alkyl acrylate may be present in amounts from 1 to 40 wt. % based on the total wt. % of the monomers present in the ethylene acid copolymer. All individual values and subranges encompassed by "from 1 wt. % to 40 wt. %" are disclosed as separate embodiments. The ethylene acid copolymer may include, for example, from 1 wt. % to 20 wt. % alkyl acrylate, from 2 wt. % to 10 wt. %, or from 10 wt. % to 30 wt. % based on the total wt. % of the monomers present in the ethylene acid copolymer.

In various embodiments of the ethylene acid copolymer, the monocarboxylic acid monomer may be optional and present in amounts from 0 to 20 wt. %. All individual values and subranges encompassed by "from 0 wt. % to 20 wt. %" are disclosed as separate embodiments. For example, the monocarboxylic acid monomer may be absent or present in an amount of from greater than 0 wt. % to 10 wt. %, from 5 wt. % to 10 wt. %, from 10 wt. % to 20 wt. %, or from 15 wt. % to 20 wt. % based on the total weight of the monomers present in the ethylene acid copolymer.

In one or more embodiments of the ethylene acid copolymer, the unsaturated dicarboxylic acid monomer may be present in amounts from 2 to 15 wt. % of based on the total wt. % of the monomers present in the ethylene acid copolymer. All individual values and subranges encompassed by "from 2 wt. % to 15 wt. %" are disclosed as separate embodiments. For example, the unsaturated dicarboxylic acid monomer may be present in an amount of from 5 wt. % to 15 wt. %, from 3 wt. % to 10 wt. %, or from 4 wt. % to 10 wt. % based on the total weight of the monomers present in the ethylene acid copolymer.

In embodiments of the ionomer of this disclosure, the ionomer may include a blend of two ethylene acid copolymer resins, a first ethylene acid copolymer polymer and a second ethylene acid copolymer. One of the first ethylene acid copolymer or the ethylene acid copolymer polymer contains unsaturated dicarboxylic acid monomer.

In various embodiments, ionomers of this disclosure may include a neutralized blend of a first ethylene acid copolymer, a second ethylene acid copolymer, and an aliphatic, mono-functional organic acid. The first ethylene acid copolymer is the polymerized reaction product of ethylene, monocarboxylic acid monomer, and, optionally, alkyl acrylate. The second ethylene acid copolymer is the polymerized reaction product of ethylene, alkyl acrylate, unsaturated dicarboxylic acid monomer, and optionally monocarboxylic acid monomer. In some embodiments, at least 30 mole percent (mol %) of total acid units of the blend are neutralized with a magnesium cation of the magnesium neutralizing salt. In one or more embodiments, from 35 to 50 mol %, from 45 to 70 mol %, from 60 to 80 mol %, or from 80 to 100 mol % of the total acid units of the blend are neutralized with a magnesium cation of a magnesium neutralizing salt.

In some embodiments, ionomers of this disclosure that include a neutralized blend of a first ethylene acid copolymer, a second ethylene acid copolymer, and an aliphatic, mono-functional organic acid may include cations other than magnesium cations and in addition to the magnesium cation in the blend. The blend may be neutralized by at least one additional metal cation of a neutralizing salt. The neutralizing salt of the at least one additional metal cation may be selected from the group of zinc salt, lithium salt, and sodium salt. In some embodiments, the ionomers may include from 0% to 10%, from 1% to 10%, from 5% to 20%, from 5% to 30%, or from 10% to 50% of the total acid units of the blend are neutralized with sodium cation of the neutralizing salt, lithium cation of the neutralizing salt, zinc cation of the neutralizing salt, or combinations thereof. In one or more embodiments, at least 70 mole percent of total acid units of the blend are neutralized by metal cations of a neutralizing salt, in which at least 30 mole present of the at least 70 mole percent of total acid units of the blend are neutralized by a magnesium cation of a magnesium salt.

In one or more embodiments, the ratio of the first ethylene acid copolymer to the second ethylene acid copolymer in the blend is from 90/10 wt. % to 10/90 wt. %; and the aliphatic, mono-functional organic acid in the blend is in amounts from 5 to 40 wt. %, based on the total wt. % of the blend. In some embodiments, the ratio of the first ethylene acid copolymer to the second ethylene acid copolymer in the blend is from 50/50 wt. % to 80/20 wt. % or from 90/10 wt. % to 60/40 wt. %.

In various embodiments, ionomers of this disclosure may include a neutralized blend of a first ethylene acid copolymer, a second ethylene acid copolymer, and an aliphatic, mono-functional organic acid. In one or more embodiments, the first ethylene acid copolymer is the polymerized reaction product of ethylene; from 2 to 20 wt. % or from 5 wt. % to 10 wt. % of monocarboxylic acid monomer, based on the total wt. % of monomer present in the first ethylene acid copolymer; from 0 to 40 wt. %, 1 wt. % to 20 wt. %, or 5 wt. % to 15 wt. % of alkyl acrylate, based on the total wt. % of monomer present in the first ethylene acid copolymer.

In one or more embodiments, the second ethylene acid copolymer is the polymerized reaction product of ethylene, alkyl acrylate, optionally monocarboxylic acid monomer, and unsaturated dicarboxylic acid monomer. The alkyl acrylate may be present in amounts from 1 wt. % to 40 wt. %, 5 wt. % to 30 wt. %, 10 wt. % to 20 wt. %, or 20 wt. % to 30 wt. % based on the total wt. % of the monomers present in the second ethylene acid copolymer. The monocarboxylic acid monomer may be present in amounts from 0 wt. % to 20 wt. %, 1 wt. % to 20 wt. %, 5 wt. % to 15 wt. % based on the total wt. % of the monomers present in the second ethylene acid copolymer. The unsaturated dicarboxylic acid monomer may be present in the second ethylene acid copolymer in amounts from 2 to 15 wt. % or 5 wt. % to 10 wt. % based on the total wt. % of the monomers present in the second ethylene acid copolymer.

In some embodiments of the ethylene acid copolymer, the first ethylene acid copolymer, or the second ethylene acid copolymer, the alkyl acrylate may be, by way of example and not limitation, ethyl acrylate, n-butyl acrylate, iso-butyl acrylate, or combinations thereof. In various embodiments, the alkyl acrylate has an alkyl group with from 1 to 8 carbons. This is designated a $C_2$-$C_8$-alkyl acrylate. In particular embodiments, the alkyl acrylate is n-butyl acrylate.

In one or more embodiments of the ethylene acid copolymer, the first ethylene acid copolymer, or the second ethylene acid copolymer, the monocarboxylic acid monomer may include, for example, one or more of acrylic acid, methacrylic acid, or combinations thereof.

In one or more embodiments of the ethylene acid copolymer or the second ethylene acid copolymer, the unsaturated dicarboxylic acid monomer includes the reaction product of in the precursor acid copolymers is unsaturated dicarboxylic acids or a derivatives of an unsaturated dicarboxylic acids. Unsaturated dicarboxylic acid monomers may include maleic acid monoethyl ester (MAME), maleic anhydride mono-propyl ester, maleic anhydride mono-ethyl ester, maleic anhydride mono-butyl ester, or combinations thereof; and $C_1$-$C_4$-alkyl half esters of these acids, as well as anhydrides of these acids including maleic anhydride, maleic anhydride mono-methyl ester, maleic anhydride mono-ethyl ester, and itaconic anhydride. The carboxylic acid or anhydride units of these monomers are capable of being neutralized with metal ions, just as the monocarboxylic acid carboxylic acid units are, though, as indicated, neutralization of the unsaturated dicarboxylic acid monomers may be different in its nature and effect on polymer properties, including melt behavior. Unsaturated dicarboxylic acids can dehydrate to form intrachain anhydride units within the polymer (i.e., within a chain, rather than cross-linking interchain anhydride units).

In various embodiments described in this disclosure, the ionomer is a fatty acid modified ionomer (FAMI). In particular, according to various embodiments, the ethylene acid copolymer is blended with an aliphatic, mono-functional organic acid. In one or more embodiments, the aliphatic, mono-functional organic acid has fewer than 36 carbon atoms. In some embodiments, the aliphatic, mono-functional organic acid includes a fatty acid having 4 to 36 carbon atoms, and is optionally substituted with one to three substituents independently selected from the group consisting of $C_1$ to $C_8$ alkyl groups. For example, the aliphatic, mono-functional organic acid may include $C_4$ to less than $C_{36}$, such as $C_{34}$, $C_{4-26}$, $C_{6-22}$, or $C_{12-22}$ or salts thereof. The fatty acid comprises at least one of behenic acid, steric acid, oleic acid, erucic acid, 12-hydroxystearic acid, and isostearic acid. At high neutralization such as greater than 80% up to 100%, nominal neutralization (for example, sufficient metal compound is added such that all acid moieties in the copolymer and aliphatic, mono-functional organic acid of the blend are nominally neutralized), volatility is not an issue and aliphatic, mono-functional organic acids with lower carbon content may be used. In some embodiments, the aliphatic, mono-functional organic acid (or salt) be non-volatile (not volatilize at temperatures of melt blending of the agent with the acid copolymer) and non-migratory (not bloom to the surface of the polymer under normal storage conditions (ambient temperatures)).

The ionomers of this disclosure include a neutralized blend of an ethylene acid copolymer and an aliphatic, mono-functional organic acid or a neutralized blend of first ethylene acid copolymer, a second ethylene acid copolymer, and an aliphatic, mono-functional organic acid. The term "neutralized blend" includes fully or partially neutralized ethylene acid copolymers. The ethylene acid copolymer may contain neutralized and un-neutralized monocarboxylic acid units, neutralized, mono-neutralized and un-neutralized unsaturated dicarboxylic acid units, and intrachain anhydride units.

In referring to the total acid units neutralized, a monocarboxylic acid provides one acid unit, a dicarboxylic acid provides two acid units, an anhydride such as maleic anhydride is considered to provide two acid units, and half esters are considered to provide one acid unit. The calculation of percent neutralization is based on the number of acid units considered to be present as per above, and the number of metal equivalents added. In fact, anhydride units may remain as anhydride units rather than be changed to acid units. When subject to neutralization, an anhydride monomer unit may form a di-metal salt, a mono-metal salt, form an un-neutralized dicarboxylic acid monomer, or leave the anhydride unit unaltered as an anhydride unit, acting as if it had no acid functionality. The half esters of dicarboxylic acid monomer, while counted as having only one acid, may actually be converted to dicarboxylic acid monomer or anhydrides, with the various possibilities related to neutralization noted above. As stated however, whatever the number of acid groups (free or neutralized) actually present, the calculated percent neutralization is based on the number of acid units based on the known amount of moles of the monocarboxylic acid and the dicarboxylic acid comonomer. In view of the various mutations of the dicarboxylic acid monomer and salts possible, the actual percent of neutralized acid groups as a percent of actual total neutralized and non-neutralized free acid groups may therefore differ from the calculated percent neutralization, which is based the amount of monocarboxylic acid monomer or dicarboxylic acid monomer in the ionomer. The difference is due to anhydride units, which are not acid units, but are counted as two acid units.

The ethylene acid copolymer may be prepared by standard free-radical copolymerization methods, using high pressure, operating in a continuous manner. Monomers are fed into the reaction mixture in a proportion, which relates to the monomer's activity, and the amount desired to be incorporated. In this way, uniform, near-random distribution of monomer units along the chain is achieved. Unreacted monomers may be recycled. Additional information on the preparation of ethylene acid copolymers including the softening monomer can be found in U.S. Pat. Nos. 3,264,272 and 4,766,174, each of which is hereby incorporated by reference in its entirety.

The blend can be produced by any means known to one skilled in the art. It is substantially melt-processable and can be produced by combining one or more ethylene acid copolymers or ionomers of the ethylene acid copolymers, one or more fatty acids or salts thereof, a basic metal compound, and a neutralizing composition including a trivalent metal cation to produce a mixture and heating the mixture under a condition sufficient to produce the composition. Heating can be carried out under a temperature in the range of from 80° C. to 350° C., from 120° C. to 300° C., or from 160° C. to 260° C. under a pressure that accommodates the temperature for a period from 30 seconds to 2 or 3 hours. The blend can be produced by melt-blending an ethylene acid copolymer and/or ionomer thereof with one or more fatty acids or salts thereof and concurrently or subsequently combining a sufficient amount of a basic metal compound and a trivalent metal cation. A salt blend of components can be made or the components can be melt-blended in an extruder. For example, a Werner & Pfleiderer twin-screw extruder can be used to mix and treat the ethylene acid copolymer and the aliphatic, mono-functional organic acid (or salt) with the metal compound at the same time.

The blend can additionally include small amounts of additives including plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into the blend.

These additives may be present in the blends in quantities ranging from 0.01 wt. % to 40 wt. %, 0.01 to 25 wt. %, 0.01 to 15 wt. %, 0.01 to 10 wt. %, or 0.01 to 5 wt. %. The incorporation of the additives can be carried out by any known process such as, for example, by dry blending, by extruding a mixture of the various constituents, by the conventional masterbatch technique, or the like.

In one or more embodiments, ionomers of this disclosure have a melt index of from 0.1 to 10.0 g/10 min, as determined in accordance with ASTM D1238 (210° C., 2.16 kg). In other embodiments, the ionomers have a melt index of from 1.0 to 10.0 g/10 min as determined in accordance with ASTM D1238 (210° C., 2.16 kg). Additionally, in some embodiments of this disclosure, the ionomer has a density of from 0.920 to 0.980 g/cc as measured according to ASTM D792.

In some embodiments, the ionomers according to this disclosure exhibit a loadbearing capability at temperatures above the melting temperatures of the ionomers as measured by Differential Scanning Calorimetry (DSC).

According to various embodiments, the ionomer may be used to form a foam or molded article. For example, in embodiments, the ionomer can be combined with additives used to control foam properties to form foams of various shapes. In some embodiments, the foam may be extruded, such as from a twin screw extruder, as is known to those of ordinary skill in the art.

Foaming agents (also referred to as blowing agents) used in the manufacture of foams can be physical foaming agents or chemical foaming agents. As used herein, "physical foaming agents" are low-boiling liquids, which volatilize under the curing conditions to form the blowing gas. Exemplary physical foaming agents include hydrocarbons, fluorocarbons, hydrofluorocarbons, hydrofluoroolefins, hydrochlorofluoroolefins, and other halogenated compounds. Other suitable chemical foaming agents can include, for example, sodium bicarbonate, ammonium bicarbonate, azodicarbonamide, dinitrosopentamethylenediamine, and sulfonyl hydrazides. Foaming agents such as water or carbon dioxide added as a gas or liquid, or generated in-situ by the reaction of water with polyisocyanate, may also be used. The foaming agents can be used in mixtures of two or more, and chemical and physical foaming agents can be used together to tailor expansion-decomposition temperature and foaming processes.

The foam composition can further include a free radical initiator or crosslinking agents, co-curing agents, an activator, and any other type of additive typically used in similar compositions, including but not limited to pigments, adhesion promoters, fillers, nucleating agents, rubbers, stabilizers, and processing aids.

Free radical initiators or crosslinking agents can include, by way of example and not limitation, organic peroxides such as dialkyl organic peroxides. Example organic peroxides suitable for use include 1,1-di-t-butyl peroxy-3,3,5-trimethylcyclohexane, t-butyl-cumyl peroxide, dicumyl-peroxide, 2,5-dimethyl-2,5-di(tertiary-butyl-peroxyl)hexane, 1,3-bis(tertiary-butyl-peroxyl-isopropyl)benzene, or combinations of two or more thereof.

Co-curing agents include trimethyl propane triacrylate (and similar compounds), N,N-m-phenylenedimaleimide, triallyl cyanurate, or combinations of two or more thereof.

Activators can include activators for the blowing agent, and can include one or more metal oxides, metal salts, or organometallic complexes. Examples include ZnO, Zn stearate, MgO, or combinations of two or more thereof.

The foam may be produced by a number of methods, such as compression molding, injection molding, and hybrids of extrusion and molding. The process can include mixing the components of the foam composition under heat to form a melt. The components may be mixed and blended using any technique known and used in the art, including Banbury, intensive mixers, two-roll mills, and extruders. Time, temperature, and shear rate can be regulated to ensure dispersion without premature crosslinking or foaming.

After mixing, shaping can be carried out. Sheeting rolls or calendar rolls can be used to make appropriately dimensioned sheets for foaming. An extruder may be used to shape the composition into pellets.

Foaming can be carried out in a compression mold at a temperature and time to complete the decomposition of peroxides and blowing agents. Pressures, molding temperature, and heating time can be controlled. Foaming can be carried out using injection molding equipment by using pellets made from the foam composition. The resulting foam can be further shaped to the dimension of finished products by any means known and used in the art, including thermoforming and compression molding.

In various embodiments, the resulting polymer foam composition can be substantially closed cell and useful for a variety of articles, e.g., footwear applications including midsoles or insoles.

In embodiments, the molded article exhibits improved creep resistance of at least 80° C., wherein molded article exhibits a dimensional change less than 25%, less than 20%, less than 18%, or less than 15% under a stress of 20 psi at 80° C. for 30 minutes.

The ionomers of the invention may be prepared by standard neutralization techniques, as disclosed in U.S. Pat. No. 3,264,272 (Rees), which is hereby incorporated by reference. The resulting ionomers, the compositions of this invention may have an MI of from 0.01 to 100 grams/10 minutes, preferably 0.1 to 30 grams/10 minutes as determined in accordance with ASTM D1238 (190° C., 2.16 kg). The total percent neutralization, as defined in the above paragraphs, is from about 5 to 90 percent, preferably 10 to 70 percent, most preferably between 25 and 60 percent. While lower neutralization levels will provide less ionomer character, higher levels will produce lower flow ionomers.

EXAMPLE

Test Procedure

Melt Index, (MI) is measured using ASTM D-1238 using a 2160 gram weight.

Melting Point (Tm) was measured using Differential Scanning Calorimetry (DSC). Differential Scanning Calorimetry (DSC) is measured on a TA Instruments Q1000 DSC equipped with an RCS cooling accessory and an auto sampler. The melting point (Tm) of the samples are measured according to ASTM D3418.

The compositions of the ionomers were determined using a Perkin Elmer Fourier Transform Infrared Spectroscopy (FTIR). Compression molded films of 5 mil thickness were used for the FTIR analysis.

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

Comparative C1 is a magnesium ionomer of a blend of 65 percent by weight of an ethylene acid copolymer and 35 percent by weight of oleic acid. The ethylene acid copolymer includes ethylene, 6.2 weight percent acrylic acid, and 28.0 weight percent n-butyl acrylate with an MI of 60 to 300 g/10 minutes as determined in accordance with ASTM D1238 (190° C., 2.16 kg), in which nominally 100% of the total acid units of the neutralized blend of ethylene copolymer and oleic acid are neutralized with Mg cations. Mg(OH)$_2$ was used for neutralization as the Mg cation source in the amount of 145% neutralization of all carboxylic acid moieties.

Comparative C2 is a Mg ionomer derived from a blend of ethylene copolymer, 65 wt. %, and erucic acid, 22.5 wt. %, where the acid copolymer is ethylene/acrylic acid/n-butyl acrylate terpolymer with 6.2 wt. % of acrylic acid and 28.0 wt. % of n-butyl acrylate with an MI of 85 g/10 minutes as determined in accordance with ASTM D1238 (190° C., 2.16 kg), wherein nominally 100% of the available carboxylic acid moieties of both ethylene copolymer and oleic acid are neutralized with Mg cations. Mg(OH)$_2$ was used for neutralization as the Mg cation source in the amount of 120% neutralization of all carboxylic acid moieties.

Comparative C3 is an ionomer of ethylene acid copolymer comprising 85 wt. % ethylene and 15 wt. % methacrylate (MAA) partially neutralized with zinc ions having a density of 0.950 g/cm$^3$ measured in accordance with ASTM D792 and a melt index, I$_2$, of 0.7 g/10 min as determined in accordance with ASTM D1238 (190° C., 2.16 kg).

Comparative C4 is an ionomer of ethylene acid copolymer comprising 85 wt. % ethylene and 15 wt. % methacrylate (MAA) partially neutralized with sodium ions having a density of 0.950 g/cm$^3$ measured in accordance with ASTM D792 and a melt index, I$_2$, of 0.9 g/10 min as determined in accordance with ASTM D1238 (190° C., 2.16 kg).

Creep resistance data is shown in Tables 1, 2, and 3. The creep test was conducted by measuring the dimensional change (vertical) of a press molded film attached to a deadload in a heated oven. Since creep resistance is a function of time, temperature, and loading (stress), the testing included those variables.

Creep resistance is a function of time, temperature, and loading weight (stress). A simple testing was adopted to differentiate the creep resistance of ionomers with and without unsaturated dicarboxylic acid co-monomer MAME neutralized with varied metal cations with and without MAME. The creep test was conducted by measuring the dimensional change (vertical) of film specimens attached to a dead load in a cross flow air oven with a shelf rack to hold specimen holders. Creep tests were performed on press molded film strips of 10 mil thick, one inch wide and 3 inches long cut out of compression molded film of 10 mil thick. The films were hung from the specimen holder with a dead load of 200 grams and with oven initially set at a temperature.

Example 1—Creep Resistance of Ethylene Acid Copolymers Containing Dicarboxylic Acid Monomers The results, as summarized in Table 1, include data derived from Inventive Example 1 and Comparison C1, the composition of which is previously described.

The copolymer composition in Example 1 is a blend of a first ethylene acid copolymer, a second ethylene acid copolymer, and an aliphatic, mono-functional organic acid. Example 1 is a blend 80% by weight of the first ethylene acid copolymer and (b) 20% by weight of the second ethylene acid copolymer. The first ethylene acid copolymer, Comparative Example C1. The second ethylene acid copolymer, E/iBA/MAME terpolymer, includes 10 weight percent of iso-butyl acrylate and 12 weight percent of MAME. The E/iBA/MAME terpolymer has a melt index (MI) of 95 g/10 minutes according to ASTM D1238 using a 2160 grams and measured at 190° C.

Example 1 was prepared in a Haake Rheocord 90 melt mixer at a temperature at about 210° C. for 5 minute at 150 rpm. The melt flow index of Example 1 is 1.0 g/10 minutes as measured according to ASTM D1238 using a 2160 grams and measured at 210° C.

The results of the creep test, as summarized in Table 1, were produced by measuring the dimensional change (vertical) of film specimens attached to a dead load in a cross flow air oven with a shelf rack to hold specimen holders. Creep tests were performed on press molded film strips of 10 mil thick, one inch wide and 3 inches long cut out of compression molded film of 10 mil thick. The films were hung from the specimen holder with a dead load of 200 grams and with oven initially set at a temperature. The deformation of the film specimen after a specified time and temperature in the oven indicated in Table 1 was measured.

TABLE 1

Dimensional Change (%) with a deadload of 200 grams

| | R.T. (24 hrs) | 40° C. (24 hrs) | 50° C. (72 hrs) | 60° C. (24 hrs) | 70° C. (24 hrs) | 80° C. (24 hrs) |
|---|---|---|---|---|---|---|
| Comp. C1 | 0.0% | 18.8% | 300.0% | failed | — | — |
| Example 1 | 0.0% | 0.0% | 18.8% | 31.0% | 75.0% | 87.5% |

The creep resistance of two polymer samples is summarized in Table 1. The creep resistance was measured over a period of 24 hours at varying temperature: room temperature (approximately 22.0° C.), 40° C., 50° C., 60° C., 70° C., and 80° C. Comp. C1, an ionomer that did not contain unsaturated dicarboxylic acid monomers, deformed between 40° C. and 50° C. Comparatively, Example 1, an ionomer containing the unsaturated dicarboxylic acid MAME showed less deformation at a temperature of 80° C. Comparatively, Example 1, an ionomer containing the unsaturated dicarboxylic acid MAME showed much less deformation between 40° C. and 50° C.

Example 2—Creep Resistance of Ethylene Acid Copolymers Containing Aliphatic, Mono-Functional Organic Acids The results, as summarized in Table 2, include data derived from Inventive Example 2. Example 2 is a blend of a first ethylene acid copolymer and a second ethylene acid copolymer. Example 2 includes 70 wt. % of a first ethylene acid copolymer, Comparative Example C1, and (b) 30 wt. % of the second ethylene acid copolymer, E/iBA/MAME terpolymer, that includes 10 wt. % of iBA and 12 wt. % of MAME with an MI of 95 g/10 min. as measured at 190° C.

Example 2 was prepared in a Haake Rheocord 90 melt mixer at a temperature at about 210° C. for 6 minute at 150 rpm. The melt flow index of Example 2 is 0.9 g/10 min. as measured according to ASTM D1238 using 2160 grams and measured at 210° C.

TABLE 2

Dimensional Change (%) with a deadload of 110 grams

| | Comp. C3 | Comp. C4 | Example 2 |
|---|---|---|---|
| 50° C. | 0.00% | 0.00% | 0.00% |
| 60° C. | 0.00% | 0.00% | 0.00% |
| 70° C. | 0.00% | 0.00% | 0.00% |
| 80° C. | 12.50% | 6.30% | 0.00% |
| 90° C. | failed | 112.50% | 12.50% |
| 100° C. | — | failed | 25.00% |
| 120° C. | | | 62.50% |

The creep resistance of three examples is summarized in Table 2. The creep tests were performed on press molded film strips of 10 mil thick, one inch wide and 3 inches long cut out of compression molded film of 10 mil thick. The films were hung with a dead load of 110 grams with oven initially set at 50° C. The deformation in percentage of the film specimen was measured after 30 minutes in the oven, and then the oven temperature was increased 10° C. The temperatures were measured at 50° C., 60° C., 70° C., 80° C., 90° C., 100° C., and 120° C. Comp. C1-C2, ionomers that did not contain unsaturated dicarboxylic acid monomers or aliphatic, mono-functional organic acids ("fatty acids"), failed at 90° C. and 100° C. Comp. C4 is an ionomer that contained fatty acids salts and not unsaturated dicarboxylic acids. Comp. C4 did not fail the creep test, but deformed by 750.0%. Comparatively, Example 2, an ionomer containing the dicarboxylic acid MAME and a fatty acid showed less deformation at temperature range from 80 C to of 100° C. than the comparative samples.

Example 3—Creep Resistance of Ethylene Acid Copolymers Containing Two Polymer Resins and Aliphatic, Mono-Functional Organic Acids The results, as summarized in Table 3, include data derived from Inventive Examples 3-7. The copolymer composition in Examples 3-7 are recorded in Table 3. Example 3, Example 4, Example 5, Example 6, and Example 7 were prepared in a 26 mm twin screw extruder with a mixing screw, using a melt temperature of between 220° C. to 250° C.

Example 3 is a blend of 80 wt. % of Comparative Example C1, and 20 wt. % of an ethylene/iso-butyl acrylate/maleic acid monoethyl ester (E/iBA/MAME) terpolymer in which there is 10 weight percent of iBA and 12 weight percent of MAME with a MI of 95 g/10 minutes according to ASTM D1238 using 2160 grams and measured at 190° C.

Example 4, Example 5, and Example 6 include a blend of Comparative Example C1 and an E/iBA/MAME terpolymer as outlined in Table 3 below. The E/iBA/MAME terpolymer has 15 weight percent of iBA and 12 weight percent of MAME with an MI of 173 g/10 minutes as measured at 190° C. according to ASTM D1238 using 2160 grams. The weight percent of the Comparative Example C1 and the percent of the terpolymer are recorded in Table 3 for each example.

Example 7 is a blend of 80 wt. % Comparative Example C2 and an E/nBA/MAME terpolymer with 15 weight percent of iBA and 12 weight percent of MAME with an MI of 173 g/10 minutes as measured according to ASTM D1238 using 2160 grams at 190° C.

Comparative C1 is the same composition as described above.

Comparative C2 is the same composition as described above.

TABLE 3

Creep Temperature when the Dimensional Change Reaches 25%

| Composition No. | Ionomer Composition | Creep Temperature |
|---|---|---|
| Example 3 | Comparative Example C1, 80 wt. %, E/nBA/MAME, 20 wt. % | 90° C. |
| Example 4 | Comparative Example C1, 80 wt. %, E/iBA/MAME, 20 wt. % | 90° C. |
| Example 5 | Comparative Example C1, 75 wt. %, E/iBA/MAME, 25 wt. % | 100° C. |
| Example 6 | Comparative Example C1, 70 wt. %, E/iBA/MAME, 30 wt. % | 100° C. |
| Example 7 | Comparative Example C2, 80 wt. %, E/nBA/MAME 20 wt. % | 100° C. |
| Comparative C1 | | 60° C. |
| Comparative C2 | | 60° C. |

In Table 3, the creep temperature was measured for each sample at the point in which the sample show a 25% change in dimension. Each polymer resin containing the unsaturated dicarboxylic monomer (MAME), Examples 3-7, showed a creep resistance of about 30-40° C. greater than that of Comp. C1.

The invention claimed is:

1. A ionomer comprising a neutralized blend of an ethylene acid copolymer and an aliphatic mono-functional organic acid, wherein the blend comprises:
   from 60 to 95 wt. %, based on the total wt. % of the blend, of the ethylene acid copolymer, the ethylene acid copolymer being the polymerized reaction product of:
      ethylene,
      from 1 to 40 wt. % of alkyl acrylate based on the total wt. % of the monomers present in the ethylene acid copolymer;
      from 0 to 20 wt. % of monocarboxylic acid monomer based on the total wt. % of the monomers present in the ethylene acid copolymer; and
      from 5 to 15 wt. % of unsaturated dicarboxylic acid monomer based on the total wt. % of the monomers present in the ethylene acid copolymer; and
   from 5 to 40 wt. % of the aliphatic mono-functional organic acid based on the total wt. % of the blend, wherein the aliphatic mono-functional organic acid has fewer than 36 carbon atoms;
   wherein at least 30 mole percent of total acid units of the blend are neutralized with a magnesium cation of a magnesium neutralizing salt.

2. The ionomer of claim 1, wherein the ethylene acid copolymer comprises 1 to 20 wt. % of alkyl acrylate.

3. An ionomer comprising a neutralized blend of a first ethylene acid copolymer, a second ethylene acid copolymer, and an aliphatic mono-functional organic acid, wherein the blend comprises:
   the first ethylene acid copolymer is the polymerized reaction product of:
      ethylene;
      from 2 to 20 wt. % of monocarboxylic acid monomer, based on the total wt. % of monomer present in the first ethylene acid copolymer; and
      from 0 to 40 wt. % of alkyl acrylate, based on the total wt. % of monomer present in the first ethylene acid copolymer;
   the second ethylene acid copolymer is the polymerized reaction product of:
      ethylene;
      from 1 to 40 wt. % of alkyl acrylate, based on the total wt. % of the monomers present in the second ethylene acid copolymer;
      from 0 to 20 wt. % of monocarboxylic acid monomer, based on the total wt. % of the monomers present in the second ethylene acid copolymer; and
      from 5 to 15 wt. % unsaturated dicarboxylic acid monomer, based on the total wt. % of the monomers present in the second ethylene acid copolymer; and
   wherein the ratio of the first ethylene acid copolymer to the second ethylene acid copolymer is from 90/10 wt. % to 10/90 wt. %; and
   from 5 to 40 wt. %, based on the total wt. % of the blend, of the aliphatic mono-functional organic acid, wherein the aliphatic mono-functional organic acid has fewer than 36 carbon atoms;
   wherein at least 30 mole percent of total acid units of the blend are neutralized with a magnesium cation of a magnesium neutralizing salt.

4. The ionomer of claim 1, wherein at least 70 mole percent of total acid units of the blend are neutralized with the magnesium cation of the magnesium salt.

5. The ionomer of claim 1, wherein the blend is further neutralized with at least one additional cation of a neutralizing salt, neutralizing salt selected from zinc salt, lithium salt, and sodium salt.

6. The ionomer of claim 3, wherein the total acid units of the blend are neutralized in a range from 80 to 100 mole percent, wherein 30 to 80 mole percent of the total acid units of the blend are neutralized with the magnesium cation of the magnesium salt.

7. The ionomer of claim 3, wherein the second ethylene acid copolymer comprises 20 to 30 wt. % of alkyl acrylate.

8. The ionomer according to claim 1, wherein the unsaturated monocarboxylic acid monomer comprises one or more of acrylic acid, methacrylic acid, or combinations thereof.

9. The ionomer according to claim 1, wherein from 80 to 100% of the total acid units of the blend is neutralized with the magnesium cation.

10. The ionomer according to claim 1, wherein the unsaturated dicarboxylic acid monomer comprises maleic anhydride, maleic anhydride mono-methyl ester, maleic anhydride mono-ethyl ester, maleic anhydride mono-propyl ester, maleic anhydride mono-butyl ester, or combinations thereof.

11. The ionomer according to claim 1, wherein the alkyl acrylate comprises methyl acrylate, ethyl acrylate, n-butyl acrylate or iso-butyl acrylate, or combinations thereof.

12. The ionomer according to claim 1, wherein the aliphatic monofunctional organic acid is a fatty acid having 4 to 36 carbon atoms, and is optionally substituted with one to three substituents independently selected from the group consisting of $C_1$ to $C_8$ alkyl groups.

13. The ionomer according to claim 12, wherein the fatty acid comprises at least one of behenic acid, steric acid, oleic acid, erucic acid, 12-hydroxystearic acid, and isostearic acid.

14. The ionomer according to claim 3, wherein the ratio of the first ethylene acid copolymer to the second ethylene acid copolymer is from 90/10 wt. % to 60/40 wt. %.

15. A foam comprising the ionomer of claim 1, wherein the foam exhibits a dimensional change less than 25% under a stress of 20 psi at 80° C. for 30 minutes.

16. The ionomer of claim 3, wherein:
the blend is further neutralized with at least one additional cation of a neutralizing salt, neutralizing salt selected from zinc salt, lithium salt, and sodium salt; and
from 80 to 100% of the total acid units of the blend is neutralized with the magnesium cation.

17. A foam comprising the ionomer of claim 3.

18. The ionomer of claim 3, wherein the blend consists of the first ethylene acid copolymer, the second ethylene acid copolymer, the aliphatic mono-functional organic acid, and from 0 to 40 wt. % of additives selected from the group consisting of plasticizers, stabilizers, hydrolytic stabilizers, primary and secondary antioxidants, ultraviolet light absorbers, anti-static agents, dyes, pigments coloring agents, inorganic fillers, fire-retardants, lubricants, reinforcing agents, synthetic fiber or pulp, foaming or blowing agents, processing aids, slip additives, antiblock agents, release agents, and tackifying resins, or inorganic fillers.

19. The ionomer of claim 3, wherein the blend comprises from 10 to 40 wt. % of the aliphatic mono-functional organic acid.

20. The ionomer of claim 3, wherein the blend further comprises from 0.01 to 40 wt. % of additives selected from the group consisting of plasticizers, stabilizers, hydrolytic stabilizers, primary and secondary antioxidants, ultraviolet light absorbers, anti-static agents, dyes, pigments coloring agents, inorganic fillers, fire-retardants, lubricants, reinforcing agents, synthetic fiber or pulp, foaming or blowing agents, processing aids, slip additives, antiblock agents, release agents, and tackifying resins, or inorganic fillers.

* * * * *